April 10, 1962 R. F. LANE 3,028,613
OUTSOLE TRIMMING MACHINES
Filed Feb. 8, 1960 8 Sheets-Sheet 1

Inventor
Robert F. Lane
By his Attorney
Douglas R. Buchanan

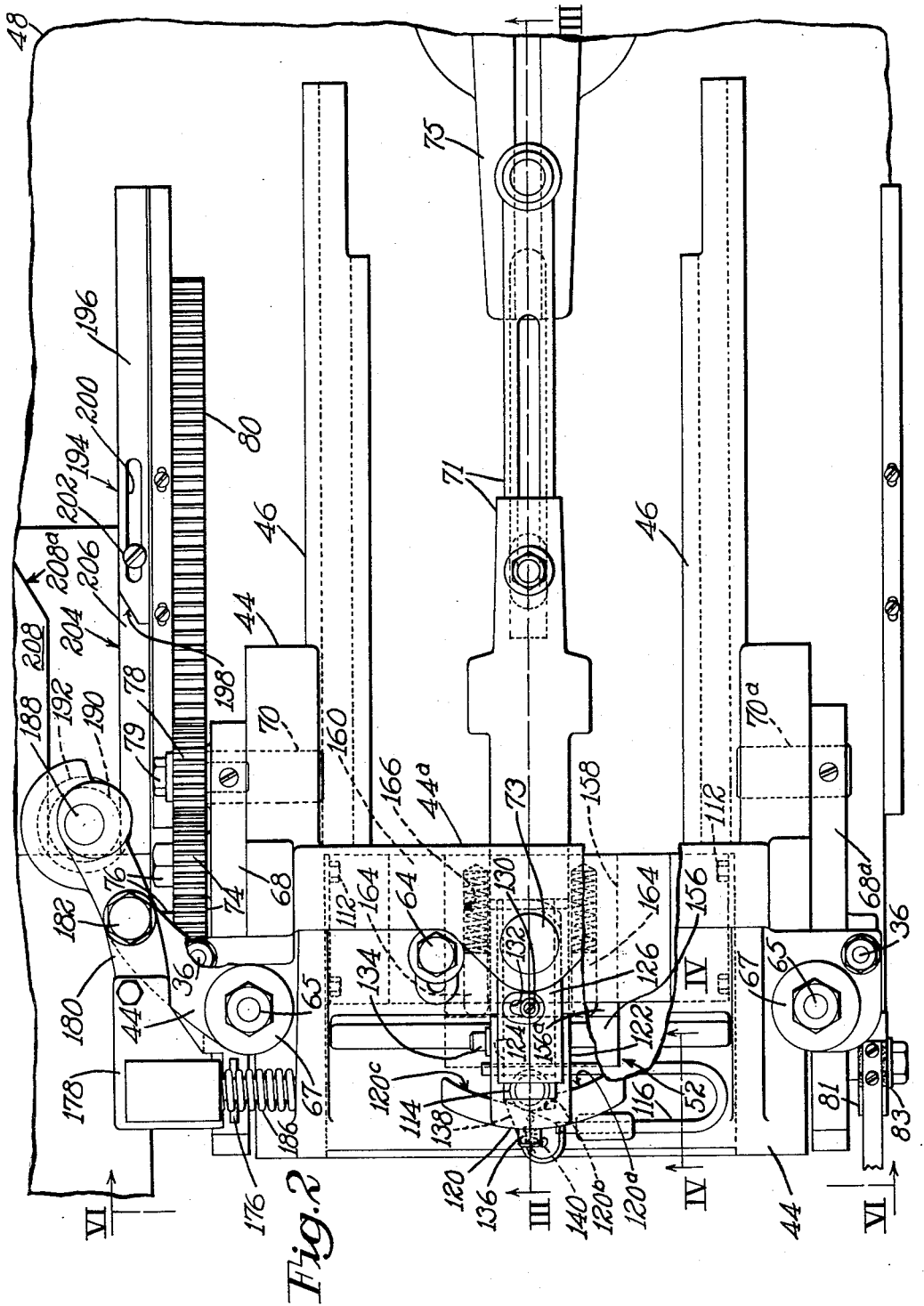

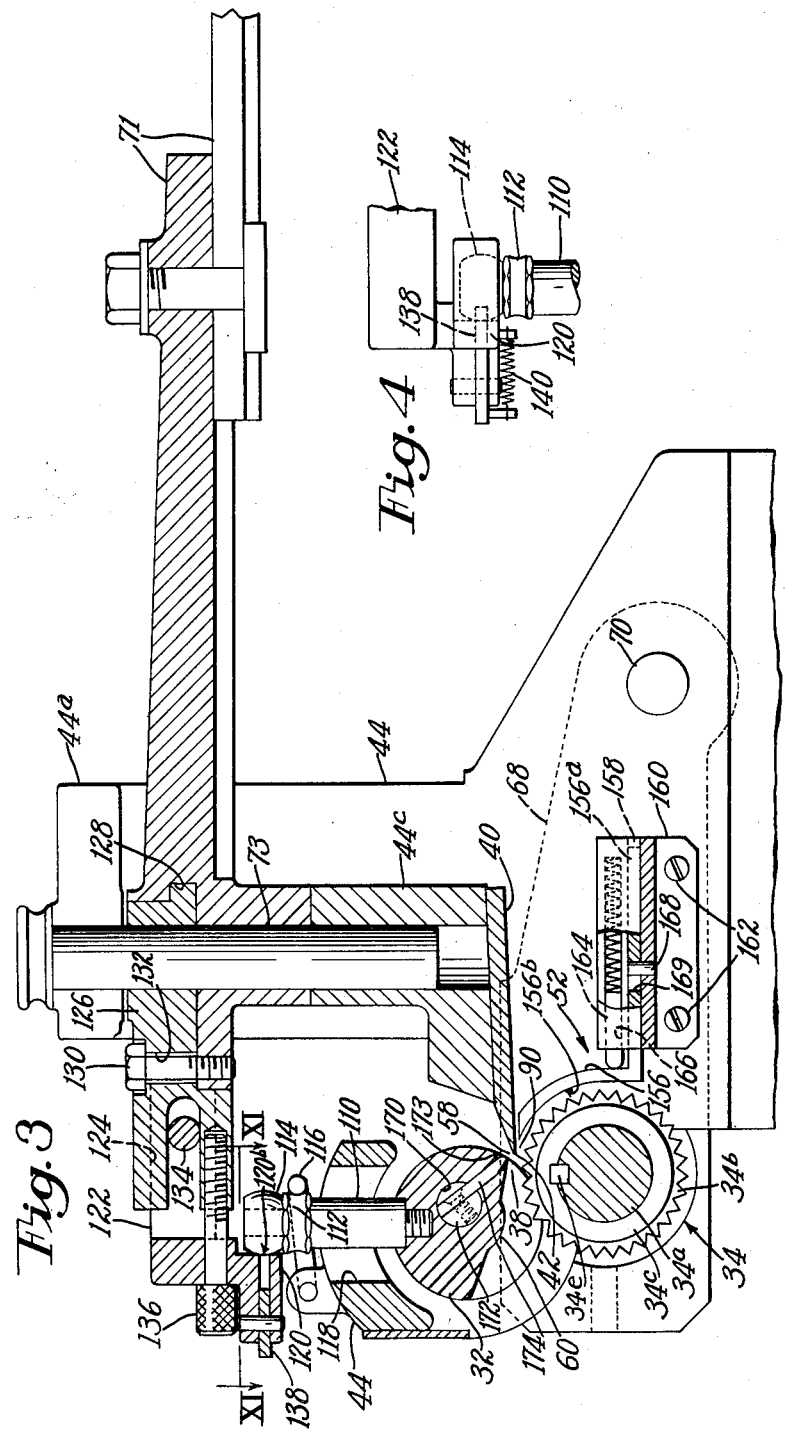

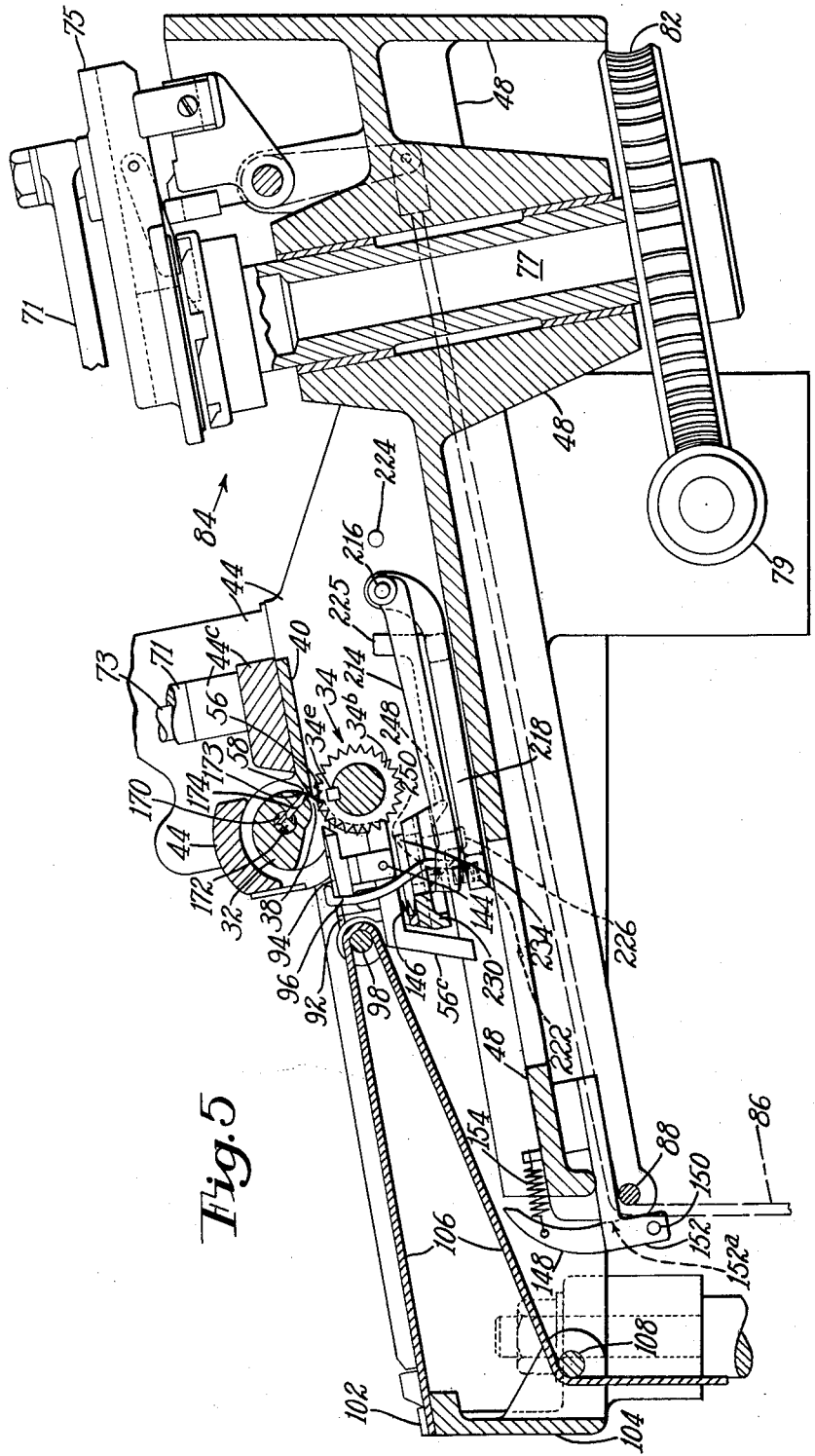

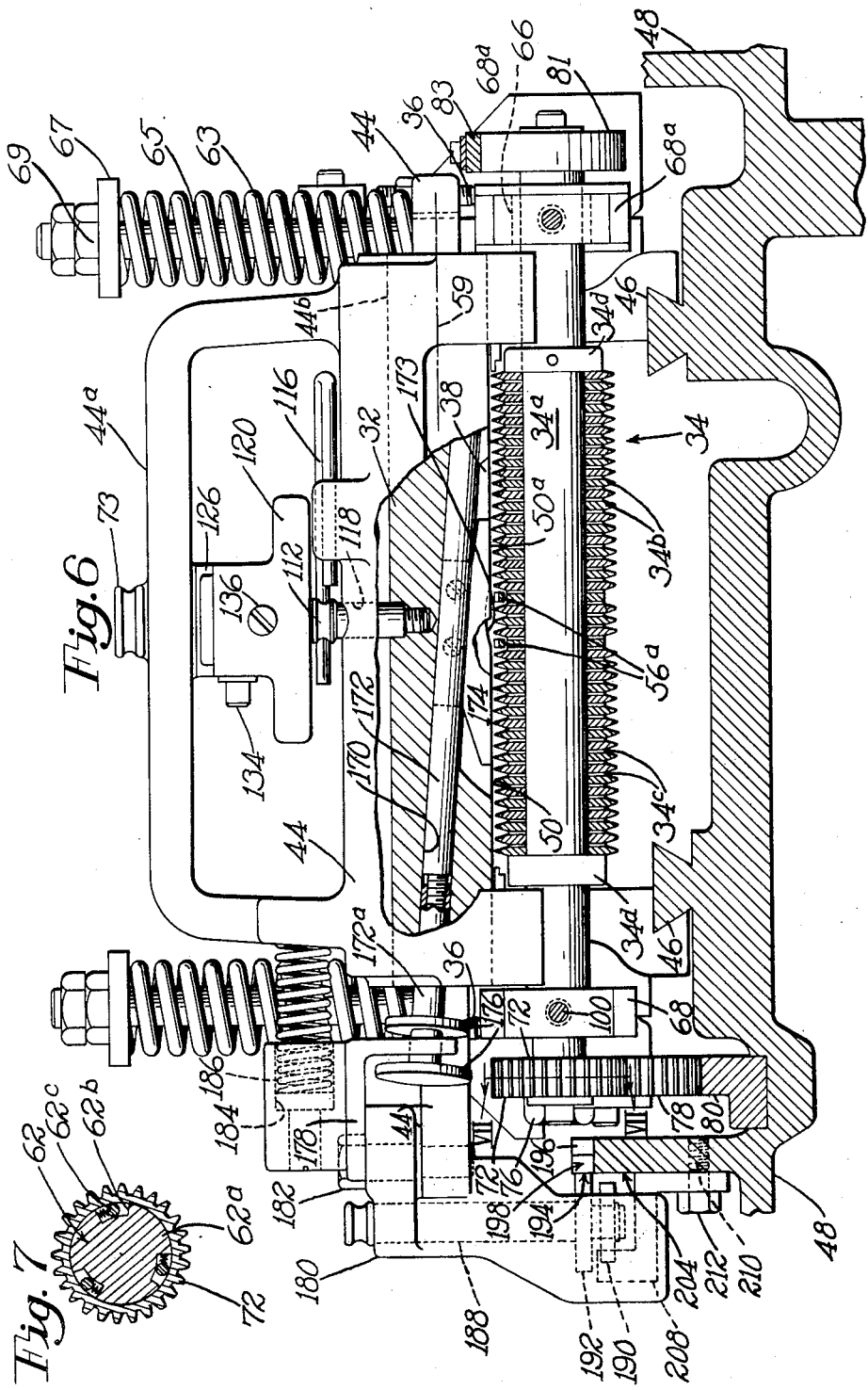

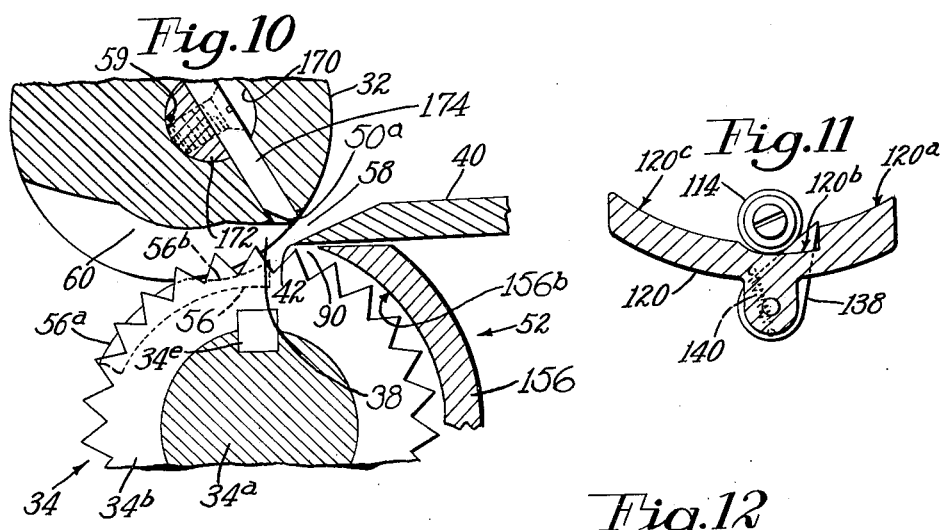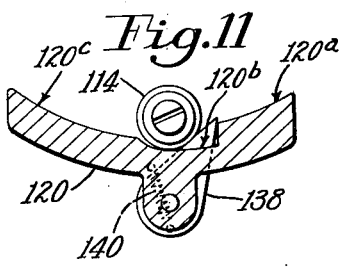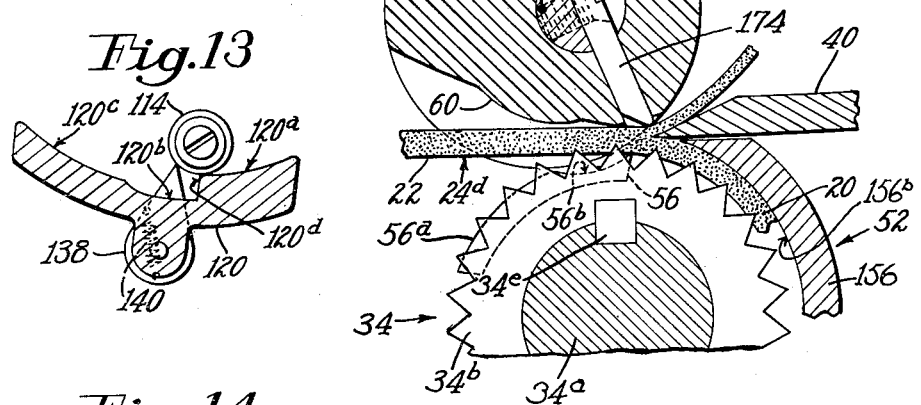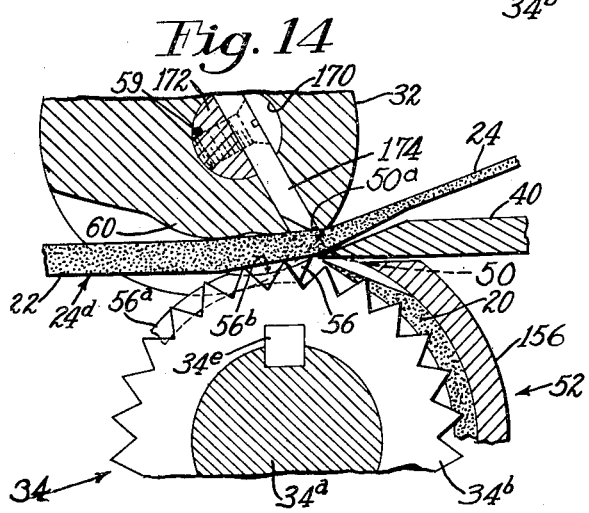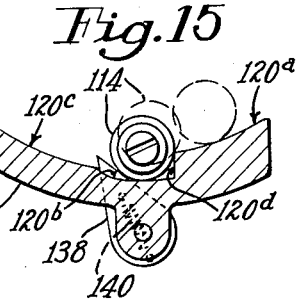

April 10, 1962   R. F. LANE   3,028,613
OUTSOLE TRIMMING MACHINES
Filed Feb. 8, 1960   8 Sheets-Sheet 8
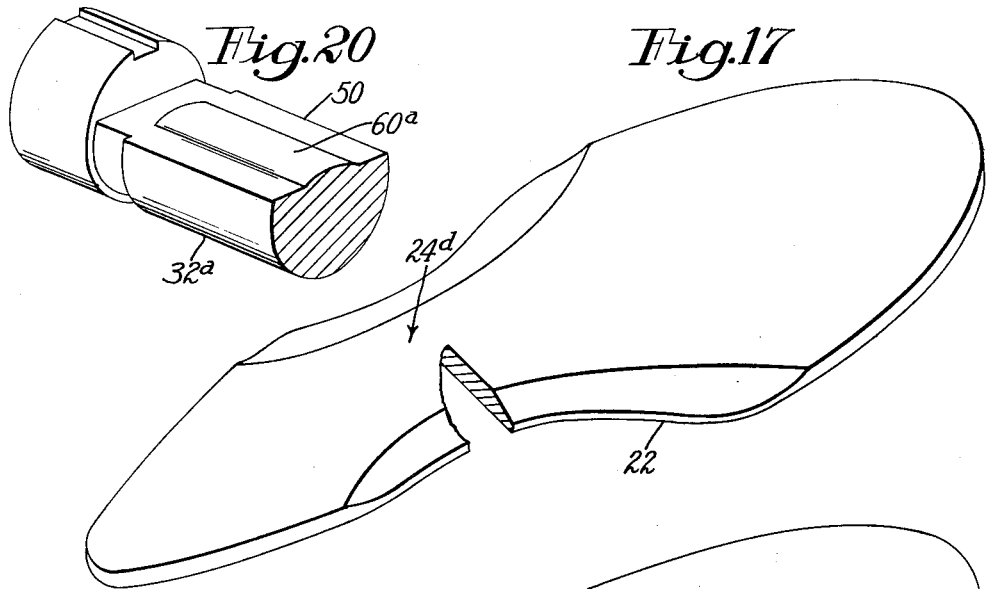
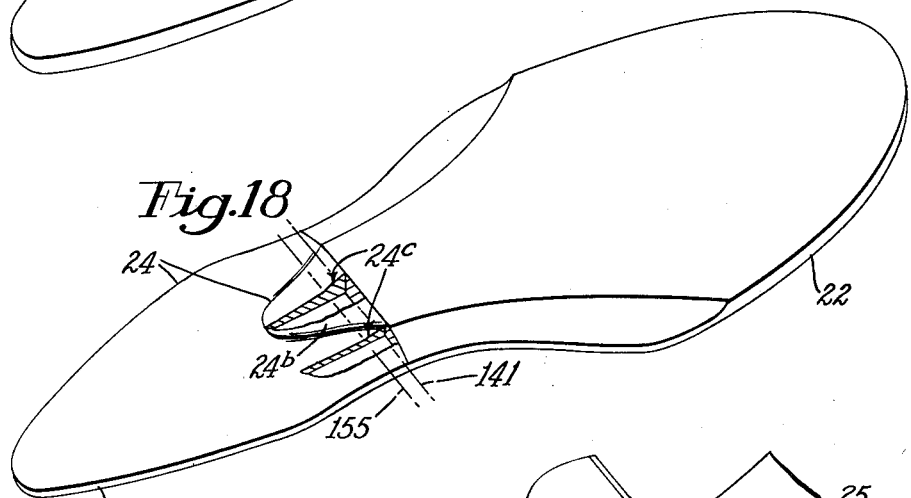
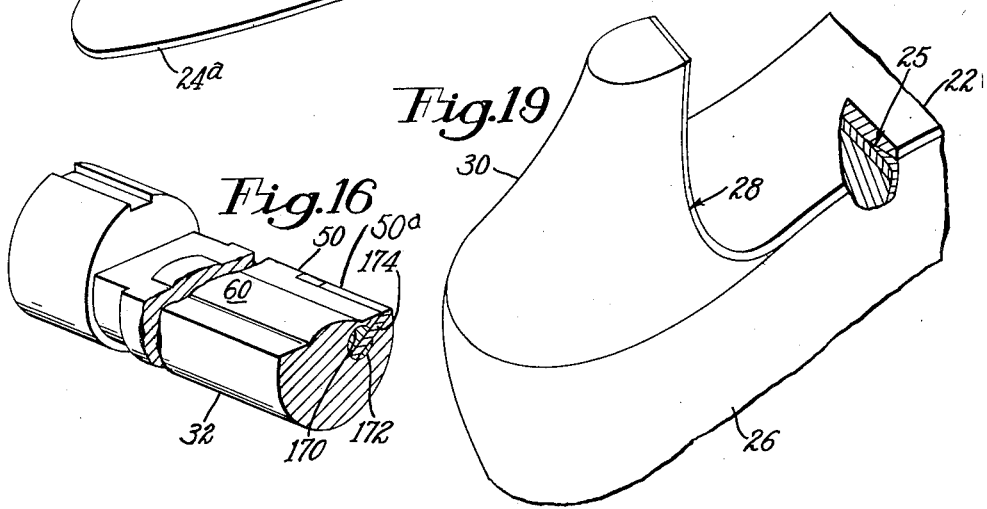

United States Patent Office 3,028,613
Patented Apr. 10, 1962

3,028,613
OUTSOLE TRIMMING MACHINES
Robert F. Lane, Danvers, Mass., assignor to United Shoe Machinery Corporation, Boston, Mass., a corporation of New Jersey
Filed Feb. 8, 1960, Ser. No. 7,456
16 Claims. (Cl. 12—16.5)

This invention relates to trimming machines for removing surplus material from the rear end of an unattached outsole of a shoe to prepare said outsole for simultaneous attachment to the bottom of the shoe and to the breast of a Louis heel attached to said shoe.

In the manufacture of women's shoes, it has been the universal practice for years to split a heel breast covering flap or "leaf" from the rear end of an unattached outsole of a shoe, the remaining portion of the rear end of said outsole being subsequently reduced or "fitted" to form a heel seat tab. After the attachment of the outsole to the shoe bottom and the attachment of a Louis heel to the heel seat of the shoe with its attaching face engaging the heel seat tab of the outsole, the flap or "leaf" of the outsole is manually applied by the use of cement to the breast of the heel. This practice has been recently superseded to a considerable extent by removing surplus material from the flesh or inner face of a leather outsole or from the inner face of a rubber composition outsole, and after the attachment of the Louis heel to the shoe, simultaneously applying, by the use of cement, the outsole to the shoe bottom and to the breast of the attached heel, said rear end of the covering flap portion of the outsole which has been applied to the breast of the heel being subsequently trimmed flush with the breast edges of the heel in accordance with the common practice. The outsole, after it has been trimmed in accordance with the aforesaid new practice, is commonly referred to as a "tabless outsole."

It is common practice to split a heel breast covering flap from the heel seat portion of an unattached outsole by the use of a machine disclosed in United States Letters Patent No. 2,677,140, granted May 4, 1954, on an application filed in the name of Robert F. Lane. For reasons which will appear later, it has been found that the machine disclosed in the above patent is unsuited for trimming a chip of surplus material from the rear end of the outsole to prepare said outsole for simultaneous attachment to the shoe bottom and to the breast of the heel, in accordance with the above-mentioned recent practice. With the above considerations in view, it is an object of the present invention to modify the machine disclosed in said Patent No. 2,677,140 so that it will quickly and effectively remove material from the heel end of the unattached outsole to provide the tabless outsole referred to above.

The present machine, like the machine disclosed in Patent No. 2,677,140, comprises a carrier which is reciprocated in a rectilinear path between a rearward or retracted position and a forward or projected position, and has secured to it a knife provided with a straight cutting edge, and upon which is journaled for movement, into different active positions during the trimming operation, a matrix bar having an outsole engaging and controlling ridge extending along and spaced by a gap from the cutting edge of the knife. The carrier also has rotatably mounted on it a toothed or pronged roll which is spring urged as a unit toward the ridge of the matrix bar and toward the cutting edge of the knife until limited by a stop and which is adapted to support the outsole and to force it against the ridge of the matrix bar during the forward movement of the carrier. The pronged roll is positively rotated on the carrier at such a speed that an outsole supporting pronged peripheral portion of the roll, on which the outsole is impaled, moves at the same speed that the carrier and accordingly the knife moves in its rectilinear path but in a direction opposite to the direction of movement of the carrier. In the illustrative machine the construction and arrangement is such that, during the trimming operation, the outsole remains substantially stationary and the knife operating upon the outsole, the position and shape of which is controlled by the matrix bar and the roll, trims a chip from the outsole, the chip passing through a passage formed between the cutting edge of the knife and the roll and the heel breast covering flap portion of the outsole passing through the above-mentioned gap formed between the ridge of the matrix bar and the cutting edge of the knife.

In order to assist in holding the outsole mounted and impaled on the pronged tooth roll against the oncoming cutting edge of the knife as the knife moves forwardly from its retracted to its projected position, the carrier has mounted on it, for example, an arcuate presser member which is constantly moved yieldingly toward the pronged roll, and in accordance with a feature of the invention is adapted to force the chip, which has been split from but is securely attached to the outsole, against the pronged roll with the result that the chip assists in holding the portion of the outsole being split in a fixed position in the machine against the oncoming knife.

In trimming the chip of surplus material from the rear end of the outsole to form the tabless outsole above referred to, it is desirable that the trimming cut shall terminate at the inner or flesh side of the outsole just ahead of the heel breast line of said outsole. Accordingly, the full thickness of the outsole passes through the gap and across a plane of movement of the cutting edge of the knife at the terminal end portion of the trimming cut. As the splitting cut progresses forwardly along the outsole to a point somewhat rearward of the heel breast line of the outsole, the matrix bar is swung in timed relation with the carrier through a small arc away from the cutting edge of the knife to a position in which the gap formed between the cutting edge of the knife and the ridge of the bar is slightly wider than the thickness of the outsole, with the result that the base of the heel breast covering portion of the outsole is trimmed on a steep bevel just rearward of where it joins the inner face of said outsole.

In order to trim the flap to a predetermined controlled thickness, it is desirable that the locus of the apices of the prongs of the roll shall be located in close proximity to the cutting edge of the knife which lies between said locus and the ridge of the matrix bar. Movement of the pronged roll toward the knife, and accordingly toward the ridge of the matrix bar, is limited when the locus of the prongs of the outsole supporting roll are approximately .008 of an inch from the cutting edge of the knife. It will be appreciated that during the trimming operation the outsole is impaled to a slight extent on the prongs of the roll, and for this reason and other reasons it is impracticable in a machine of this sort to provide a roll which will move the outsole against the ridge of the matrix bar when the gap formed between the ridge of said bar and the cutting edge of the knife has a width approaching the full thickness of the outsole as at the rear end portion of the trimming cut. With the foregoing considerations in view, the illustrative machine, in accordance with another feature of the invention, is provided with an elevator associated with the roll, and means for causing, during the terminal end portion of the trimming cut, the elevator to move the portion of the outsole immediately ahead of the cutting edge of the knife away from the roll and against the ridge of the matrix bar which at this time is being swung in the carrier, as above described, to produce the maximum gap between the ridge of the matrix bar and the cutting edge of the knife, whereby to move the full thickness of the outsole across the plane of the cutting edge of said knife.

It will be appreciated that when the portion of the outsole which lies immediately ahead of the cutting edge of the knife and is normally relied upon to hold the outsole stationary against the action of said knife is moved away from the roll, the work will not be ordinarily held effectively against the action of the knife at this point and, accordingly, the trimming cut will terminate before reaching the inner face of the outsole and removing the chip from the outsole. Moreover, as above explained, at the end of the terminal cut the chip which is trimmed from the outsole cannot be relied upon to hold against movement the portion of the outsole being split against the action of the oncoming trimming knife. With the foregoing in view, and in accordance with a further feature of the invention, the matrix roll is provided with a salient portion adapted, as the matrix bar is swung in the carrier to its terminal position, to hold a portion of the outsole, which trails the heel breast line portion of the outsole being trimmed, impaled on the roll to insure that the outsole shall be effective held against the action of the cutting edge of the knife.

The present invention consists in the above features and in novel features hereinafter disclosed, reference being had to the accompanying drawings which illustrate one embodiment of the invention selected for purposes of illustration, said invention being fully disclosed in the following description and claims.

In the drawings,

FIG. 2 shows in plan, partly broken away, a portion of the machine at the time that a carrier thereof is at a forward end of its operating stroke;

FIG. 3 is a section on the line III—III of FIG. 2;

FIG. 4 is a side view on the line IV—IV of FIG. 2 showing in detail mechanism for operating a matrix bar which is journaled on the carrier;

FIG. 5 is a longitudinal section, partly broken away, corresponding in part to the section shown in FIG. 3 and illustrating outsole positioning mechanism and carrier driving mechanism of the machine;

FIG. 6 shows the machine, partly in section and partly broken away, as viewed along the line VI—VI of FIG. 2 when the machine is in its rest position;

FIG. 7 is a section on the line VII—VII of FIG. 6;

FIG. 10 is an enlarged median sectional view showing the relative positions of a trimming knife, the matrix bar and a pronged work supporting roll all of which are mounted on the carrier of the machine, when the machine is idle;

FIG. 11 is a view on the line XI—XI of FIG. 3 showing, when the machine is idle, the relative positions of a crank actuated cam of the machine and a matrix bar controlling rod;

FIG. 12 is a view similar to FIG. 10, but showing the relative positions of the trimming knife, the matrix bar and the pronged work supporting roll when an outer relatively thin part of the heel breast covering portion of the outsole is being formed on the outsole;

FIG. 13 is a view similar to that shown in FIG. 11 and showing the relative positions of the crank operated cam and the matrix bar controlling rod during the major portion of the outsole trimming operation, the matrix bar and the work supporting roll at this time being in their positions shown in FIG. 12 with respect to the trimming knife;

FIG. 14 is a view corresponding to FIGS. 10 and 12 showing the relative positions of the trimming knife, the matrix bar and the pronged work supporting roll at the terminal end of the trimming cut on the outsole;

FIG. 15 is a view similar to those illustrated in FIGS. 11 and 13 showing the relative positions of the cam and the matrix bar at the terminal end of the trimming cut;

FIG. 16 is a view showing in perspective part of the matrix bar incorporated in the machine;

FIGS. 17 and 18 show respectively a shank reduced outsole before and after it has been trimmed by the illustrative machine;

Figure 1:
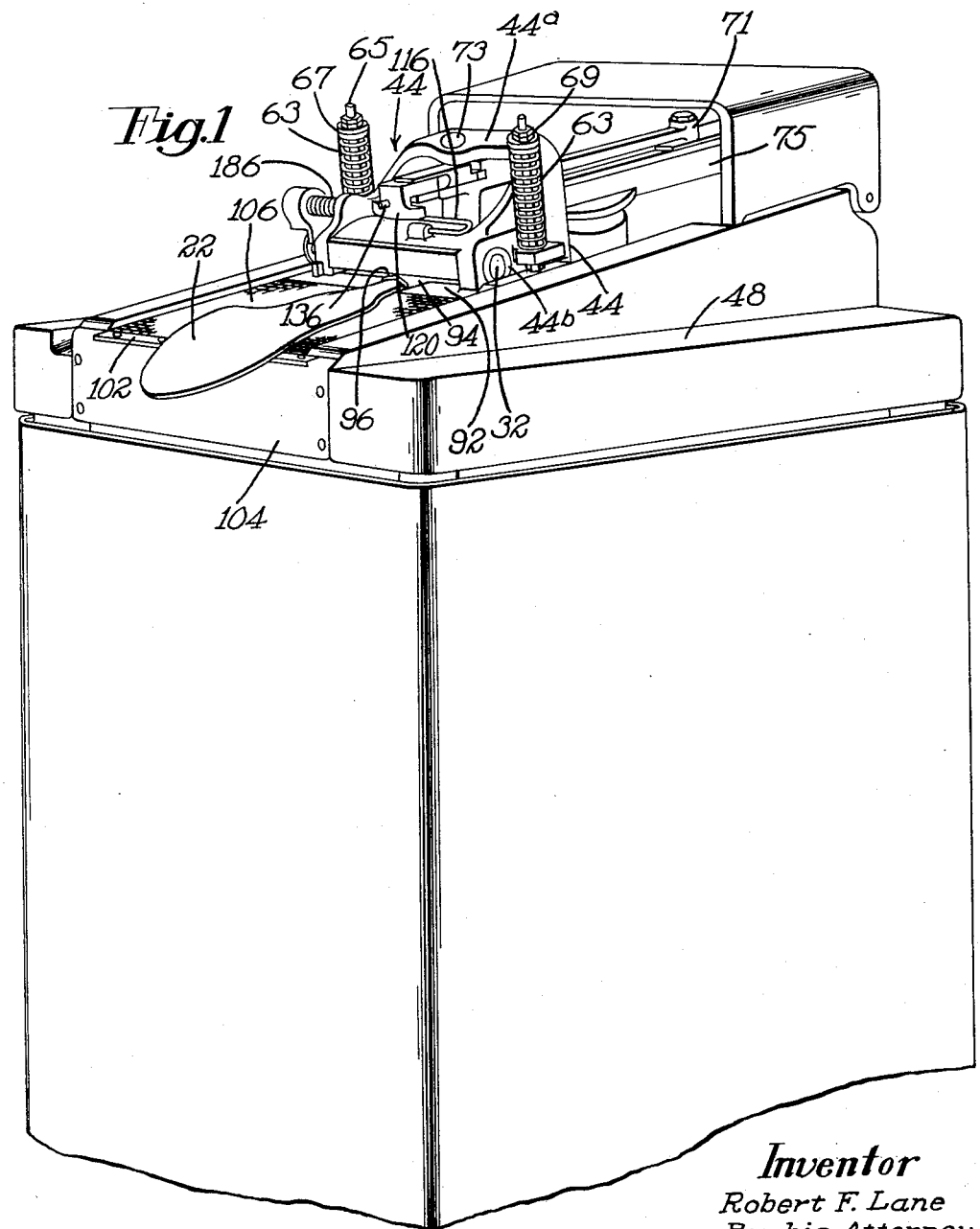
FIG. 1 shows in perspective an illustrative machine to which an outsole is being presented.

FIG. 19 is a perspective view of a rear end portion of a shoe to the overlasted bottom of which and to the attached heel of which the outsole shown in FIG. 18 has been attached by the use of cement, the heel breast covering portion of the outsole having been trimmed flush with the lateral breast edges of the heel and with a top lift receiving face of the heel; and FIG. 20 shows in perspective a portion of a matrix bar which may be used in place of the matrix bar illustrated in FIG. 16.

The illustrative machine is described with reference to removing a chip of surplus material 20 (FIGS. 12 and 14) from the rear end portion of an unattached outsole 22, which has already been shank reduced, to form a heel breast covering or flap portion 24 (FIG. 18) at the rear end of the outsole. The outsole 22 is subsequently attached by the use of cement in one operation to a bottom 25 (FIG. 19) of a shoe 26 and to the breast 28 of a heel 30, which has been already attached to the shoe, by the use of a machine such as disclosed in an application Serial No. 763,055 filed September 24, 1958, in the name of Helge Gulbrandsen, the subject matter of which now appears in application Serial No. 91,547 filed February 24, 1961. The process above described is commonly referred to as the outsole and breast flap attaching process and will be hereinafter referred to as such. It will be noted that the trimmed outsole 22 shown in FIG. 18 does not have the conventional heel seat portion which remains as part of the outsole after the flap has been split therefrom and which is subsequently trimmed by a heel seat fitting operation after the attachment of the outsole to the shoe whereby to provide a so-called heel seat tab which in the finished shoe is engaged by the attaching face or "cup" of the heel of said shoe. Accordingly, the outsole 22 shown in FIG. 18 may be referred to as a "tabless" outsole.

After the attachment of the outsole 22 to the bottom 25 of the shoe and to the breast 28 of the heel 30 of said shoe the projecting lateral margins of the flat are trimmed flush with the breast edges of the heel in the usual manner. The heel breast covering portion 24 of the outsole 22 has a thin marginal portion 24a (FIG. 18) which is of substantially uniform thickness and of substantial area, and a relatively thick or reinforced median base 24b. It will be noted that the heel breast covering portion 24 of the outsole 22 has at its base a sharply beveled face 24c which is formed at the end or terminal portion of the trimming operation and results in the merging of the inner face of the heel breast covering flap portion with an inner face 24d of the shank portion of the outsole.

As above explained, the construction of shoes by the use of "tabless" outsoles is more economical than and has to a large extent superseded prior conventional shoe constructions which utilize an outsole having a heel breast covering flap (not shown) which is split from but remains attached to the outsole and is quickly and effectively formed, for example, by the use of the machine disclosed in the above-mentioned Patent 2,677,140 and also disclosed in United States Letters Patent No. 2,603,802, granted July 22, 1952, on an application filed in the name of Robert F. Lane.

The present machine comprises a matrix or drag bar 32, a pronged or toothed outsole supporting roll 34 which rotates clockwise as viewed in FIGS. 3, 5, 10, 12 and 14 and is spring urged, until limited by stop screws 36 (FIGS.

2 and 6) hereinafter referred to, toward the matrix bar and which forms a passage or opening 38 (FIGS. 5, 6 and 10) with said bar. The matrix bar 32, the outsole supporting roll 34 and a knife 40 are supported on a carrier 44 (FIGS. 2 and 6) which, as will be hereinafter explained, reciprocates along ways 46 of a main frame 48, the roll moving clockwise as viewed in FIGS. 3 and 5 in response to forward movement of the carrier at a variable speed but remaining motionless on the carrier during rearward movement of said carrier as will be explained later. The peripheral speed of the pronged outsole supporting roll 34, during forward movement of the carrier 44 from its rear or retracted position to its forward or projected position, is substantially the same as the variable speed of the carrier 44 along the ways and accordingly during the forward movement of the carrier there is little movement of the outsole, which is initially positioned in the machine by means hereinafter explained, the oncoming or forwardly moving knife 40 being effective to trim surplus material from the outsole 22 which is flexed or deformed to a predetermined shape by reason of its being forced against a gaging ridge or edge 50 or 50a of the matrix bar 32.

As will be hereinafter explained, the present machine differs from the machine disclosed in the above-mentioned Patent No. 2,677,140 in providing: (1) a spring-actuated presser member 52 (FIGS. 3, 10, 12 and 14) for forcing the chip of surplus material 20 against the pronged outsole supporting roll 34 to cause said chip to assist in the supporting of the outsole 22 against the action of the oncoming knife 40; (2) an elevator or auxiliary outsole support 56 (FIGS. 5, 10, 12 and 14) which, during the terminal portion of the outsole trimming operation, lifts the portion of the outsole 22, then just in advance of the cutting edge 42 of the knife 40, away from the roll 34 then moving as an entirety to its raised position limited by the screws 36, and which maintains this portion of the outsole in forced engagement with the ridge 50 or 50a of the matrix bar 32 which at this time is being swung counterclockwise in the carrier 44 about its axis 59 from its position shown in FIG. 12 to its position shown in FIG. 14, thus insuring that, as a gap 58 (FIGS. 3, 5 and 10) formed between the gaging ridge 50 or 50a and the cutting edge 42 of the knife 40 increases in width by reason of the matrix bar rotating slightly counterclockwise, the outsole shall be constantly forced with substantial pressure against said ridge and with the assistance of mechanism hereinafter explained, will be moved across a general plane of reciprocation of the cutting edge 42 of the oncoming knife 40 whereby to cause the trimming cut to terminate at an inner face 24d of the shank portion of the outsole; (3) a longitudinal salient portion 60 which is formed on the matrix bar 32 and which, near the terminal portion of the trimming cut is adapted to force, as best shown in FIG. 14, a trailing shank portion of the outsole, which is spaced from the knife 40 by a heel breast line portion of the outsole, against the pronged roll 34 thus insuring that said heel breast line portion of the outsole being trimmed shall be securely held against the action of the knife to insure the completion of the trimming cut terminating at said inner face 24d; and (4) a drive comprising a one-way clutch 62 (FIG. 7) for insuring that the pronged roll 34 shall remain idle as the carrier 44 moves from its forward or projected position to its rear or retracted position. The above and other detail improvements for rendering the machine effective in providing "tabless" outsoles such as above described will be hereinafter disclosed in detail.

The carrier 44 comprises a transversely arched portion 44a and has the knife 40 secured to it by screws 64 (FIG. 2), the matrix bar 32 being journaled in bearings 44b (FIG. 1) for movement about the axis 59 of said bar. The work supporting roll 34 is rotatable in bearings 66 (FIG. 6) mounted in the forward ends of side arms 68, 68a (FIGS. 2, 3, 6 and 8) which are secured to studs 70, 70a respectively journaled in side walls of the carrier 44. The supporting roll 34 has operatively connected to its left end, as viewed from the front of the machine, through the one-way clutch 62, a gear 72 (FIGS. 2, 6 and 7) operatively connected through a pair of idler gears 74 (FIG. 2), which are mounted on bearing studs 76 threaded into the arm 68 and the rear one of which meshes with a gear 78 rotatably mounted on a bearing screw 79 threaded into the stud 70 and meshing with a rack 80 secured to the main frame 48.

The pronged roll 34 comprises a shaft 34a having mounted on it a plurality of toothed or pronged disks 34b separated by washers 34c (FIGS. 3 and 6) and clamped together by collars 34d which are threaded onto and are secured against movement of the shaft, a key 34e preventing rotation of the toothed disks on said shaft. The one-way clutch 62 (FIG. 7) comprises a disk 62a which is formed integral with the shaft 34a of the feed wheel 34 and which has a plurality of peripheral recesses 62b of tapering depths, said recesses having housed in them spring-pressed balls 62c bearing respectively against the bottoms of the associated recesses and against an inner peripheral face of the gear.

The outsole 22 is impaled to a slight extent on the toothed or pronged disks 34b of the roll 34 and in order to render the teeth or prongs of said disks more effective in supporting of outsoles 22 provided with shank reduced portions, the diameters of the disks at the mid portion of the roll may be reduced. When the carrier 44 moves forwardly the gear 72 is rotated clockwise as viewed in FIG. 7 causing the disk 62a of the one-way clutch and accordingly the pronged roll 44 to rotate clockwise as viewed in FIGS. 3, 5, 10, 12 and 14. When the carrier 44 moves rearward to its starting or retracted position the gear 72 rotates counterclockwise about the then idle disk 62a which is held against rotation by mechanism which will be presently described and also by the chip of surplus material 20 positioned between the disks 34b of the roll 34 and the presser member 52. The pronged roll 34 is prevented from rotating freely on the arms 68, 68a by the provision of a drum 81 (FIGS. 2 and 6) which is secured to the shaft 34a and has constantly forced against it a spring-pressed brake 83.

The side arms 68, 68a in which the pronged roll 34 is rotatably mounted are constantly urged upwardly by heavy springs 63 (FIGS. 1 and 6) surrounding rods 65 which pass through bores in laterally projecting lugs of the carrier 44 and the lower ends of which are threaded into the side arms. The springs 63 bear against the lugs of the carrier and are confined by washers 67 and nuts 69 on the upper ends of the rod 65. Upward movement of the side arms 68, 68a, and accordingly the outsole supporting roll, is limited by the engagement of said arms with the screws 36 which, as above explained, are threaded into the lugs of the carrier 44.

The carrier 44 is reciprocated along the ways 46 of the main frame by a connecting rod 71 (FIGS. 1, 2, 3 and 5) pivotally coupled to the carrier 44 by a vertical pin 73 extending between the arched portion 44a of the carrier and a transverse rib 44c of the carrier. The rear end of the connecting rod 71 is pivotally connected to a crank 75 at the upper end of a shaft 77 (FIG. 5) which is driven by a worm 79 operatively connected to a worm gear 82 secured to the bottom of the shaft. Interposed between the shaft 77 and the crank 75 is a one-revolution clutch 84 controlled by a cable 86 extending over a cross rod 88 on the main frame 48 and downward to a treadle (not shown).

As above explained the knife 40 is so adjusted in the carrier 44 by the use of the screws 64 that its cutting edge 42 lies at the rear end of the opening 38 and between the ridge 50, 50a of the matrix bar 32 and the common locus of the apices of the teeth or prongs of the work supporting roll 34. The width of the gap 58 formed between the ridge 50, 50a of the matrix bar 32 and the cutting edge 42 of the knife 40 establishes a thickness of the heel breast covering or flap portion 24 of the trimmed outsole 22, the chip of surplus material 20 trimmed from the outsole moving through a passage 90 (FIGS. 3 and 10) formed between said cutting edge and the pronged roll 34. The width of the passage 90 may be described as the distance between the cutting edge 42 of the knife and the locus of the apices of the teeth or prongs of the disks 34b of the roll 34.

The machine is provided with an outsole supporting table 92 (FIGS. 1, 5, 8 and 9) having a rearwardly projecting central outsole engaging portion 93 (FIG. 8) and a pair of slots 94 through which pass upstanding legs of a work positioning gage 96, said table having journaled on its front end a transverse roller 98. The table 92 is secured by screws 100 to the forward ends of the roll supporting arms 68, 68a. Secured by a bar 102 (FIGS. 1 and 5) to a front plate 104 removably attached to and in effect forming part of the main frame 48 is a canvas curtain 106 which passes around the roller 98 mounted on the table and downwardly and forwardly about a cross rod 108 supported by rearward extensions of the front plate. As disclosed in Patent No. 2,603,802 the curtain is weighted in order that it shall be taut between the front of the machine and the roller 98 as the carrier 44 moves back and forth along the ways 46 of the main frame 48.

The matrix bar 32 has threaded into it an upstanding rod 110 (FIGS. 3, 4 and 6) provided with a circular groove 112 and having mounted on it a cam roll 114. Resting in the groove 112 of the rod 110 is one arm of a U-shaped spring 116 secured to a lug of the carrier 44. The rod 110 passes through a slot 118 in the carrier 44, the cam roll 114 being constantly urged by the spring 116 against a cam 120 having a bifurcated portion 122 which engages in grooves 124 (FIGS. 2 and 3) formed in side faces of an adjustment block 126 mounted on the vertical pin 73 and registering in an arcuate guideway 128 (FIG. 3) of the aforementioned connecting rod 71. The adjustment block 126 is secured in an initially selected position to the connecting rod 71 by a screw 130 threaded into the connecting rod and passing through an arcuate slot 132 in the block which may be considered as forming part of said rod. A cross screw 134, which extends through a bore in one of the bifurcations 122 of the cam 120 and is threaded into the other bifurcation and which passes through a slot in the block 126, serves to clamp said cam in its desired position to the block 126. The cam 120 may be adjusted lengthwise of the machine by the use of a screw 136 which is rotatable in a horizontal bore of the cam and is threaded into the block 126. The cam 120 comprises track portions 120a, 120b and 120c (FIG. 15) which are centered approximately about the center of the vertical pin 73, the track portions 120a and 120b being separated by a drop-off shoulder 120d.

When the machine is at rest, the carrier 44 being in its rear or retracted position, the cam roll 114 is in its position shown in FIG. 11 in engagement with the track portion 120b. During the first 180° of rotation of the crank 75 clockwise, as viewed from above, from its starting position shown in FIG. 5 the carrier 44 is moved forwardly and the cam 120 is swung clockwise from its starting position in FIG. 11 and then counterclockwise back to its position shown in FIG. 15, the track portion 120a swinging along the roll 114 in opposite directions. At the extreme end of forward movement of the carrier 44 the cam, as above stated, is in its position shown in FIG. 15, the roll 114 which has been swung forward, with relation to the carrier 44 about the axis 59 of the matrix bar 32, into engagement with the track portion 120b of the cam 120 causing the matrix bar 32 to be swung to its position shown in FIG. 14 in which the ridge 50, 50a of the bar allows the full thickness of the outsole 22 to be moved across the plane of travel of the cutting edge 42 of the knife 40, first by the spring actuated upward movement of the prolonged outsole supporting roll 34 and then by the upward movement of the elevator 56 the construction and operation of which will hereinafter be described in detail.

In order to provide the sharply beveled face 24c (FIG. 18) on the flap portion 24a of the outsole, the cam 120 is provided with the drop-off shoulder 120d and the track portion 120b of the cam 120. In order that the cam 120 may swing smoothly clockwise from its rest position shown in FIG. 11 causing the track portion 120a of the cam to engage the cam roll 114, the cam has pivotally mounted on it a ramp 138 which is constantly urged clockwise as viewed in plan by a spring 140 one end of which is attached to a pin secured to the ramp and the other end of which is attached to a pin secured to the cam.

The operator places the rear end of the untrimmed outsole 22 on the table 92 with its inner face 24d downward and with its rear end in engagement with a V-shaped upper end of the gage 96 which at this time projects slightly above the table. When the one-revolution clutch 84 is engaged the crank 75, which is then in its rear or rest position shown in FIG. 5 starts to rotate clockwise as viewed from above. As the carrier 44 starts to move forwardly along the ways 46 the cam 120, together with the ramp 138 which is then in engagement with the upper end of the shoulder 120d as shown in FIG. 11, swings clockwise, as viewed from above, causing the ramp to swing clockwise past the roll 114 with the result that the track portion 120a of the cam is brought into engagement with the cam roll and the matrix bar 32 is swung clockwise against the action of the spring 116 from its position shown in FIG. 10 to its position shown in FIG. 12 in which the ridge 50, 50a of said bar is in its lowered position whereby to form with the cutting edge 42 of the knife 40 a minimum gap 58 for the particular work on hand. It will be noted that when the ramp 138 is thus positioned its apex projects a slight distance beyond the track portion 120a. Accordingly, shortly before the forward limit of movement of the carrier 44 is reached as the cam 120 is being swung counterclockwise with relation to the cam roll 114, the roll engages the apex portion of the ramp 138 and swings said ramp clockwise to its position shown in FIG. 15 with relation to the cam, the cam roll 114 being swung about the axis 59 of the matrix bar into engagement with the track 120b of the cam 120 by the action of the spring 116. When this occurs the ridge 50, of the matrix bar 32 forms a gap 58 of maximum width with the cutting edge of the knife 40, the width of said gap being approximately equal to the full thickness of the outsole. It will be noted that as the matrix bar 32 swings in the carrier 44 from its position shown in FIG. 12 to its position shown in FIG. 14 the sharply beveled face 24c is formed at the base of the heel breast covering flap 24a of the trimmed outsole, the severing cut terminating at the inner face 24d of the outsole 22 just forward of a heel breast line 141 (FIG. 18) of the outsole.

Near the extreme end of the trimming cut the pronged roll 34 will have reached its limit of upward movement by reason of the roll supporting arms 68, 68a engaging the stops 36, the locus of the apices of the teeth of said roll then being spaced approximately .008″ from the cutting edge 42 of the knife 40. As above explained, at this time the chip of surplus material 20 is nearly severed from the outsole 22 and cannot be relied upon to assist in holding the work against the oncoming knife. If the chip of surplus material 20 is solely relied upon at this time to hold the work against the action of the knife 40 there is a tendency to tear the outsole at the terminal end of cut and this leaves attached to the outsole "stringy" fibres which are objectionable. It will be noted that the portion of the outsole 22 being trimmed has a tendency to be "sucked" away from the supporting roll 34 but in order to form the contracted bevel face 24c it has been found necessary to force the heel breast line portion of the outsole firmly against the ridge 50 of the matrix bar 32 by the upward supporting movement of the elevator 56.

The elevator 56 comprises a pair of arcuate fingers 56a (FIGS. 6, 10, 12, 14) which are interposed between adjacent pairs of toothed disks 34b at the middle portion of the outsole supporting roll 34 and are raised in timed relation with the forward movement of the carrier 44 to force the portion of the outsole being trimmed against the ridge 50 of the matrix bar 32, the bridge 50a, as will be explained later, at this time being inactive as shown in FIG. 12. It will be noted (FIGS. 10, 12 and 14) that the arcuate fingers 56a have formed in their upper rear end portions concave faces 56b which are spaced slightly from the cutting edge 42 of the knife 40 and above which the toothed disks 34b of the roll 34 at all times project. As above explained, in order to insure that the outsole 22 shall be held against the action of the oncoming knife 40 by the pronged supporting roll 34, as the matrix bar 32 swings to and is held in its position shown in FIG. 14 on the carrier, the salient portion 60 of said bar effectively forces the portion of the outsole, which is located somewhat in advance of the heel breast line portion of the outsole being trimmed, against the portions of the adjacent toothed disks 34b projecting above the concave faces 56b of the fingers 56a and also against the upper portions of the other feed disks with the result that the outsole is held against the oncoming cutting edge 42 of the knife 40 until the completion of the trimming cut.

The fingers 56a of the elevator 56 are formed integral with an L-shaped portion 56c (FIG. 5) which is journaled on a fulcrum pin 144 carried by a lug secured to and depending from the table 92. The L-shaped arm 56c is constantly biased clockwise as viewed in FIG. 5 by a spring 146 supported by a lower plate 230 hereinafter referred to, and normally forces the fingers 56a of the elevator 56 against wide separator washers 34c of the work supporting roll 34, the construction being such that the peripheral faces of the fingers 56a of the elevator normally lie radially well within the common locus of the prongs or teeth of the adjacent pronged disks 34b.

The L-shaped arm 56c of the elevator 56 is swung counterclockwise as viewed in FIG. 5 about the fulcrum pin 144 near the forward end of movement of the carrier 44 by engagement with an actuator arm 148 which is pivotally mounted on a bearing pin 150 secured to a bifurcated angle plate 152 fixed to and, in effect, forming part of the main frame 48. The actuator arm 148 is normally held in its idle position against a stop face 152a of the angle plate 152 by a spring 154 the forward end of which is attached to the actuator arm and the rear end of which is attached to a stud secured to the main frame 48.

When the carrier 44 has moved forward to a position in which the rear end portion of the outsole 22 has been split forward to a line 155 (FIG. 18) the matrix bar 32 starts to swing about its axis 159 from the position shown in FIG. 12 to the position shown in FIG. 14 and simultaneously therewith the L-shaped arm 56c of the elevator 56 engages the actuator arm 148 causing the heel breast line portion of the outsole to be forced by said elevator against the ridge 50 of the matrix bar as the gap 58 is opened to a width substantially equal to the full thickness of the portion of the outsole being trimmed. During the first part of this swinging movement of the matrix bar 42 the pronged roll 34 will normally be raised slightly under the action of the springs 63 until limited by the stops 36. In the meanwhile the rear ends of the fingers 56a of the elevator 56 maintain the outsole 22 in forced engagement with the ridge 50 to insure that the entire thickness of the outsole is moved across the plane of movement of the cutting edge of the knife 40 to complete the trimming cut at the inner face 24d of said outsole, the sharply beveled face 24c being formed during this cut. In order to insure that the portion of the outsole 22 which trails the outsole portion located just rearward of the heel breast line 141 shall not be moved away from the pronged roll 34 during the terminal portion of the trimming cut and thus result in failing adequately to support the outsole against the action of the oncoming knife 40, the salient portion 60 of the matrix bar 32, during the swinging of said bar to its position illustrated in FIG. 14, assumes a position in which it insures that said trailing portion of the outsole is adequately impaled onto the teeth or prongs of the disks 34b of the roll.

As the carrier 44 is moved rearward after the trimming operation has been completed the cam 120 swings counterclockwise as viewed from above about the axis of the fulcrum pin 73, the track 120c of the cam being brought into engagement with the roll 114 with the result that this roll is swung clockwise slightly from its position shown in FIG. 14. After the ramp 138 has been swung counterclockwise past the roll 114 it is swung on the cam 120 by the action of the spring 140 to its idle position against the upper end of the shoulder 120d of the cam. It will be noted that as the matrix bar 32 swings clockwise slightly from its position shown in FIG. 14 in response to clockwise movement (FIG. 3) of the cam roll 114, the salient portion 60 of the matrix bar will have moved sufficiently away from the toothed disks 34b of the fully raised work supporting roll 34 to insure that the outsole will be released as the carrier moves rearward.

The spring actuated presser member 52 comprises an arcuate foot 156 (FIGS. 3, 10, 12 and 14) having a guide portion 156a (FIG. 3) mounted for reciprocation in a guide-way 158 of a bearing block 160 secured by screws 162 to the carrier 44. The arcuate foot 156 is constantly urged toward the pronged roll 34 by spring-pressed plungers 164 slidingly mounted in bores 166 of the block 160, movement of said arcuate foot toward the roll being limited by a stop 168 which is secured to the block and extends into a slot 169 formed in the guide portion 156a. A work-engaging face 156b of the arcuate foot 156 of the presser member 52 is arranged for the most part approximately concentric with the locus of the apices of the prongs of the toothed disk 34b so that said foot will properly accommodate surplus material of different shapes trimmed from the outsole 22. As above explained, during the trimming operation the chip of surplus material 20 is impaled by the presser member 52 onto the pronged disks 34b of the work supporting roll 34 and during rotation of said roll exerts a constant clockwise pull (FIG. 12) against the outsole to assist in holding it substantially stationary against the trimming action of the forwardly moving knife 40.

As above explained in detail in Patents Nos. 2,603,802 and 2,677,140, the matrix bar 32 is provided with an oblique bore 170 (FIGS. 3, 5, 6 and 16) adapted slidingly to receive a rod 172 to which is secured a masking plate 174 used to fill a recess 173 (FIG. 6) formed in the ridge 50 of the matrix bar and operative during the last portion of the forward travel of the carrier 44 to control the formation of the median base portion 24b of the heel breast covering portion 24 of the trimmed outsole 22. The plate carrying rod 172 has a threaded extension 172a permitting ready adjustment of the length of the rod and has a head grooved to provide spaced flanges 176 (FIGS. 2 and 6) between which there is received a bifurcated lower end of a control member 178 attached to the forward end of a swinging lever 180 pivoted on a stud 182 threaded into a lateral extension of the carrier 44. The control member 178 is provided with a bore 184 for receiving one end of a spring 186 the other end of which bears against a side face of the arched portion 44a of the carrier 44. The bottom ridge or edge 50a of the masking plate 174 is arranged along side a central portion of the ridge 50 of the matrix bar 32 and when the masking plate is in its lowered position shown in FIG. 6 the bottom ridge 50a takes over the function of the adjacent portion of the ridge 50a of said bar and, for all practicable purposes, may be considered as part of the edge or ridge 50.

A depending portion of the swinging lever 180 has a bore for receiving a rod 188 having rotatably mounted on its lower end small and large cam rolls 190, 192. When the machine is at rest the large cam roll 192 engages an outer face 194 of a cam strip 196 which has a beveled end face 198 and may be secured to the main frame 48 in different forward and rearward adjusted positions, the cam strip, for purposes of adjustment being provided with a slot 200 through which passes a screw 202 threaded into the main frame. When the machine is idle the large roll 192 is in engagement with the outer face 194 of the cam strip 196 and accordingly the rod 172 is in a position in which the masking plate 174 renders the recess 173 inactive, the small roll 190 at this time being spaced from a face 204 of the main frame 48. As the carrier 44 is moved forwardly along the ways 46 the large cam roll 192 travels down the beveled end face 198 of the cam strip 196 and into a notch 206, the small roll 190 being moved into engagement with the face 204 of the main frame 48 by the action of the spring 186 with the result that the rod 172 is moved along the bore 170 to a position in which the recess 173 is rendered effective to form the reinforced median base portion 24b of the heel breast covering portion 24 of the trimmed outsole 22. It will be noted that at this time the ridge 50a of the masking plate 174 is ineffective, the ridge 50 of the matrix bar, which has the recess 173 formed in it, effectively conforming the outsole to the desired shape.

In order to insure that the masking plate 174, which is attached to the rod 172 and is normally urged to its recess exposing position by the spring 186, shall be positively slid to this position, the machine is provided with a cam 208 having a face 208a adapted, as the carrier 44 moves forward and the large roll 192 starts to ride down the beveled end face 198 of the cam strip 196, to be engaged by the small roll 190 whereby positively to deflect said roll to move it against the face 204 of the main frame 48. The cam 208 has formed in it a depending flange to provide a slot 210 through which passes a pair of screws 212 which are threaded into the main frame 48 and normally have their heads bearing against the flange to hold the cam in its adjusted position forwardly and rearwardly of the machine. The cam strip 196 is initially secured to the main frame 48 in its desired adjusted position by the use of the screw 202, the position of the beveled end face 198 of this strip determining the position wherein the median reinforced base 24b of the heel breast covering portion 24 of the outsole 22 starts. The cam 208 is initially adjusted to an active position in which its face 208a is engaged by the small cam roll 190 at the same time that the large cam roll 192 starts down the beveled end face 198 of the cam strip. Except for the cam 208, the masking plate 174 and the mechanism for operating it is substantially the same as corresponding mechanism disclosed in Patent No. 2,677,140 and accordingly no further description of this subject matter is believed to be necessary. If it is desired to form on an outsole a heel breast covering portion 24 which does not have a reinforced median base 24b a matrix bar 32a such as shown in FIG. 20 may be provided. The matrix bar 32a is provided with a ridge 50b and a salient portion 60a corresponding respectively to the ridge 50 and the salient portion 60 of the matrix bar 32.

Figure 8:
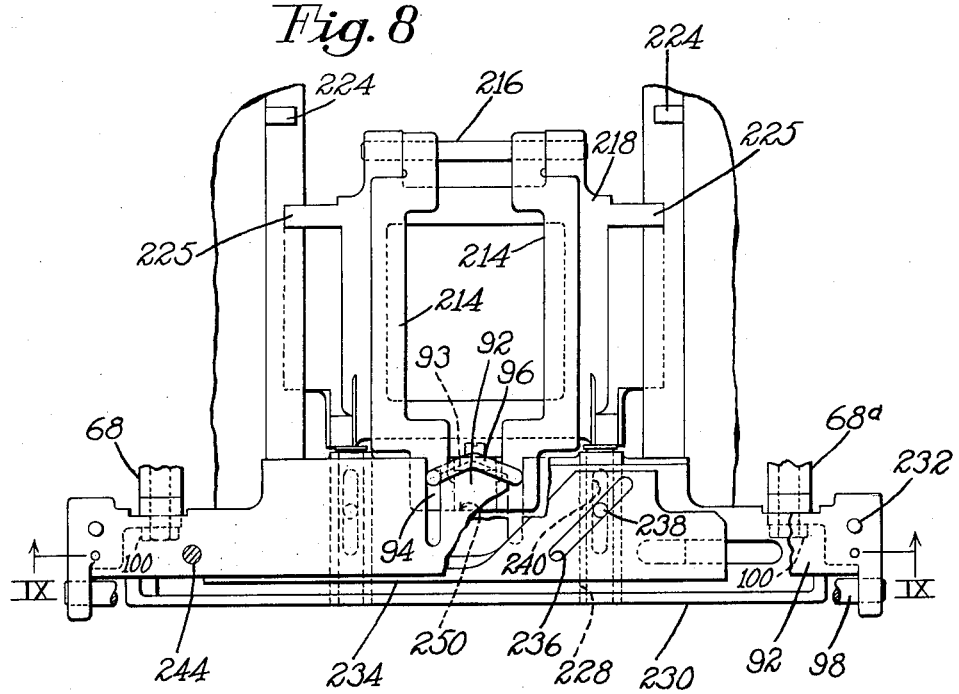
FIG. 8 shows in plan a portion of a work supporting table of the illustrative machine and gage mechanism for positioning the heel end of the outsole upon said table.
Figure 9:
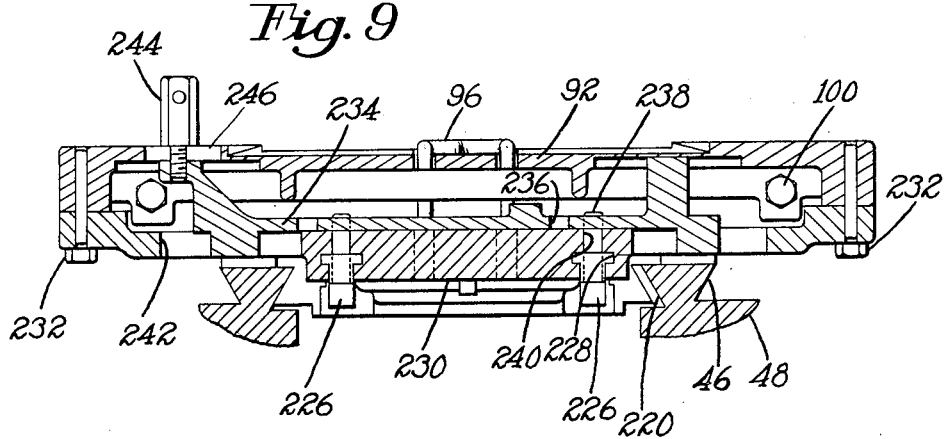
FIG. 9 is a section on the line IX—IX of FIG. 8.

As above explained, the outsole 22 placed on the bar 102 and upon the canvas curtain 106 as shown in FIG. 1 is positioned upon the table 92 by engaging the rear end of the outsole with the gage 96 which when the machine is at rest or at the end of its cycle extends slightly above the table, said gage being mounted on a U-shaped support 214 (FIGS. 5 and 8). As above explained, the table 92 is attached by screws 100 to the forward ends of the arms 68, 68a which carry the pronged roll 34. The U-shaped support 214 is carried by a fulcrum pin 216 extending between rear upturned ends of a block or slide 218 which is supported slidingly on the inner and top faces of the ways 46 and is provided with a friction gib 220 (FIG. 9) serving to resist movement of the block on said ways. The gage carrying support 214 is constantly urged to its raised position by a spring 222 opposite ends of which are mounted respectively in recesses of the block 218 and of a cross bar of the support.

The block 218 is moved forwardly by pins 224 secured to the carrier 44 and adapted to engage upstanding flange portions 225 of the block. The block 218 is moved rearwardly by depending lugs 226 which are T-shaped in transverse cross section and are adjustably mounted initially in grooves 228 formed in the under side of a cross or lower plate 230 secured at its lateral margins by screws 232 to the bottom of the lateral ends of the table 92. The adjusted positions of the lugs 226 may be varied lengthwise of the grooves 228 to control the timing of the depression of the gage support 214, by mechanism which includes an intermediate cross plate 234 having formed in it diagonal slots 236 adapted to receive pins 238 which extend upward from the lugs 226 and pass through longitudinally elongated slots 240 in the cross or lower plate 230.

The intermediate plate 234 has depending portions fitting slidingly in slots 242 in the lower plate 230. The intermediate plate 234 has threaded into it a hand screw 244 the shank of which passes through a transverse slot 246 in the table 92, a head of said screw serving as a handle for use in the sliding of said intermediate plate transversely of the machine with relation to the table and also serving as a clamp for securing the intermediate plate in its adjusted position to the table. When the screw 244 registers at the left end of the slot 246 a forward movement of the carrier 44 for about ¼" causes the gage 96 to disappear. Adjustment of the screw 244 to the right necessitates a longer forward motion of the carrier 44 before the gage 96 is depressed. Depression of the gage support 214 in order to prevent the gage 96 from pushing aside an outsole when the trimming cut starts is effected by a depending cam portion 248 (FIG. 5) of the lower plate 230 adapted to be engaged by an inclined surface 250 of the U-shaped support 214, said cam portion cooperating with said inclined surface to depress the heel support 214 soon after the carrier 44 starts its forward movement to grip the end of the outsole 22 between the matrix bar 32 and the supporting role 34. At this time the side pins 224 on the carrier 44 engage the flanges 225 of the block 218. For the rest of the forward movement of the carrier 44 the block 218 and the gage support 214 remain in the same positions with relation to the carrier.

When the carrier 44 starts its rearward movement back to its retracted position the pins 224 move away from the upright flanges 225 of the block 218 and because of the friction between the block and the ways 46 said block remains motionless until the depending lugs 226 engage the forward end of the block 218 and move it rearward. Just before this occurs the cam portion 248 of the lower plate 230 will have moved out of engagement with the cam surface 250 on the U-shaped gage support 214 thereby allowing the gage to rise into engagement with the under surface of the outsole which at this time is being removed from the machine.

Having thus described my invention, what I claim as new and desire to secure by Letters Patent of the United States is:

1. In a trimming machine, a matrix bar having a ridge, a knife having a cutting edge forming a gap with said ridge, mechanism for moving the matrix bar into different active positions to move said ridge relatively to the knife to increase or decrease the width of the gap, a stop, a support for a work piece, spring actuated means for moving, until limited by said stop, the support as an entirety toward the knife and the matrix bar, means for effecting relative movement, at substantially right angles to said movement of the support as an entirety, between the bar and the knife on the one hand and the support on the other hand to cause the knife to trim from said work piece on the support material forced against the matrix bar by said support, means operative in timed relation with said second-named means for moving a portion of the work piece immediately in advance of the cutting edge of the knife away from the support and against the ridge of the matrix bar when motion of the support toward the matrix bar has been limited by said stop, and mechanism operative in timed relation with said second-named means for forcing a portion of the work piece, which trails the portion of the work piece operated upon by said third-named means, against said support to insure that relative movement of the bar and the knife on the one hand and the support on the other hand shall cause said portion of the work piece, which has been moved away from the support by said third-named means, to partake of said relative movement and thus be trimmed by said knife.

2. In a trimming machine, a matrix bar having a ridge, a knife having a cutting edge forming a gap with said ridge, mechanism for moving the matrix bar into different active positions to move said ridge relatively to the knife to increase or decrease the width of the gap, a stop, a pronged roll for supporting a work piece, spring actuated means for moving, until limited by said stop, the roll as an entirety toward the knife and the matrix bar, means for effecting relative movement, at substantially right angles to said movement of the roll as an entirety, between the knife and the bar on the one hand and the roll on the other hand to cause the knife to trim from said work piece on the roll material forced against the matrix bar by said roll, means operative in timed relation with said second-named means for moving a portion of the work piece immediately in advance of the cutting edge of the knife away from the roll and against the ridge of the matrix bar when motion of the roll toward the matrix bar has been limited by said stop, and mechanism operative in timed relation with said second-named means for forcing a portion of the work piece, which trails the portion of the work piece operated upon by said third-named means, against said roll to insure that relative movement of the bar and the knife on the one hand and the roll on the other hand shall cause said portion of the work piece, which has been moved away from the roll by said third-named means, to partake of said relative movement and thus be trimmed by said knife.

3. In a trimming machine, a knife having a cutting edge, a matrix bar having a ridge positioned adjacent to and extending along the cutting edge of the knife, a pronged roll, a stop, means for yieldingly urging the roll toward said bar, until it is limited by said stop, whereby to force a work piece against the ridge of said bar, means for effecting relative movement between the knife and the matrix bar on the one hand and the roll on the other hand to cause the knife progressively to trim by a splitting cut a chip of surplus material from said work piece, and a member for forcing, near the terminal end of the trimming cut, a portion of the work piece immediately in advance of the cutting edge of the knife away from the roll, which is then in engagement with the stop, and against the ridge of the matrix bar, said bar having a salient portion which is adapted to force a portion of the work piece trailing that portion of the work piece which is forced against said ridge against the pronged roll whereby to insure that the outsole is firmly held against the roll.

4. A machine for trimming material from the rear end of an outsole having, in combination, a knife provided with an elongated cutting edge, a matrix bar having a ridge, a pronged roll spaced from and forming with the ridge a notch in which the cutting edge of the knife is arranged, said ridge of the bar and said roll forming respectively with said cutting edge a gap and a passage, means for yieldingly urging said roll as an entirety toward the ridge of the bar to force an outsole in said notch against said ridge, a stop for limiting movement of said roll toward the ridge of the bar, power means for effecting relative movement between the knife and the matrix bar on the one hand and the roll on the other hand to cause the knife to trim a chip of surplus material from the outsole by a splitting cut starting at the rear end of and part way through the outsole impaled on the roll and progressing through the outsole to its heel breast line, the trimmed rear end of the outsole and the chip trimmed from the outsole passing respectively through the gap and the passage, means operative in timed relation with said power means for moving the bar to a position in which said ridge forms with said cutting edge a gap at least as wide as the thickness of the outsole whereby to cause the chip to terminate at an inner face of the outsole just forward of said heel breast line, and a member for forcing, when upward movement of the roll is limited by said stop near the terminal end of the trimming cut, the heel breast line portion of the outsole immediately in advance of the cutting edge of the knife away from the roll and against the ridge of the matrix bar, said bar having a salient portion adapted to hold a portion of the outsole trailing that portion of the outsole, which is forced against said ridge by said member, impaled on the pronged roll.

5. In a machine for trimming material from a rear end of an outsole to form on said outsole a heel breast covering portion, a knife having a substantially straight cutting edge, a matrix bar which is journaled for movement into different adjusted positions about an axis extending generally parallel to the cutting edge of the knife, said matrix bar having a ridge spaced from the cutting edge to form a gap therewith and having a salient portion spaced from said ridge, a roll spaced from the ridge of the matrix to form an opening therewith and adapted to force an outsole against said ridge, a stop for limiting movement of the roll toward said ridge, means for effecting relative movement between the knife and the matrix bar on the one hand and the roll on the other hand to cause the knife to trim a piece of surplus material from the outsole, and an auxiliary support for moving the outsole away from the roll, movement of which toward the matrix bar has been limited by the stop, and against said ridge, said salient portion being adapted to urge portions of the outsole which are located just rearward of the portion of the outsole forced against the ridge by the auxiliary support against the pronged roll to insure that the knife shall trim the outsole even though the portion thereof in advance of the cutting edge of the knife has been forced away from the roll.

6. In a trimming machine, a carrier, a knife which is secured to the carrier and has a cutting edge, a matrix bar which is carried by and is adjustable into different positions in the carrier and which has a ridge arranged adjacent to and extending along the cutting edge of the knife and also has an adjacent trailing salient portion spaced from said ridge and extending generally lengthwise of said cutting edge, mechanism for forcing an outsole against said ridge of the matrix bar and for supporting said outsole for presentation to the knife, means for effecting relative movement between said mechanism and said carrier to cause the outsole controlled by said mechanism and said ridge to be split by said knife to form a chip which is attached to the outsole in the vicinity of its heel breast line, means for moving said matrix bar in the carrier to a position in which the ridge is displaced a maximum distance, which is substantially equal to the full thickness of the outsole at its heel breast line portion, from the cutting edge of the knife as a heel breast line portion of the outsole is presented to the knife, and an elevator operative simultaneously with said last-named means for forcing the heel breast line portion of the outsole away from said mechanism and against the ridge, said salient portion of said bar, when the ridge is being displaced to said maximum distance from the cutting edge of the knife, being adapted to hold a rear shank portion of the outsole which is located adjacent to said heel breast line portion of the outsole against said mechanism to insure relative movement between the knife and the outsole during a terminal end portion of the trimming cut in which the chip is removed from the outsole.

7. In a trimming machine, a carrier mounted for reciprocation in a predetermined path, means for moving the carrier in said path, a knife which has a cutting edge and is fixed to the carrier, a matrix bar fulcrumed on the carrier and having a ridge which is positioned adjacent to and extends along the cutting edge of the knife and forms a gap with said edge, means for moving on said carrier the bar and accordingly the ridge into different active positions to vary the width of said gap, arms pivotally mounted on the carrier, a pronged outsole supporting roll which is fulcrumed on said arms and forms an opening with the ridge of the bar, means for rotating the roll as it moves with the carrier in one direction in said path, a stop, resilient means operating against said arms for causing the roll to move, until limited by the stop, an outsole toward and into engagement with the ridge of the bar as the carrier moves in said one direction whereby to hold the outsole against the action of the cutting edge of the knife, and an auxiliary outsole supporting member for moving during a terminal end of the trimming cut the portion of the outsole located in advance of the cutting edge of the knife away from the roll, movement of which toward the matrix bar is limited by said stop, and for forcing it into forced engagement with said ridge, said matrix having a salient portion which is spaced from said ridge and is adapted to force portions of the outsole which trail said terminal end of the trimming cut against the roll whereby to insure that the terminal portion of the outsole supported by the auxiliary supporting means shall be effectively held against the action of the knife during this portion of the trimming cut.

8. In a trimming machine, a matrix bar having a ridge, a pronged roll spaced from said ridge to form with said ridge an opening into which an outsole is inserted, a knife having a cutting edge arranged in said opening and spaced from the ridge of the bar and from the roll respectively to form a gap and a passage adapted to receive a trimmed rear portion of the outsole and a chip of material which is being trimmed from the outsole, power means for reciprocating the matrix bar, the knife and the roll together, a stop, means for yieldingly moving the roll toward the matrix bar to cause the outsole to be pressed against the ridge of the bar, power means for rotating the roll to cause the outsole to be held against the action of the knife to trim a chip of material from the rear end of the outsole by a splitting cut, the trimmed rear end portion of the outsole passing through said gap and surplus material split from said outsole passing through said passage, an elevator adapted to be moved toward the matrix bar to remove a portion of the outsole just ahead of the knife from the roll, movement of which toward the matrix bar at this time is limited by said stop, and means operative in timed relation with the first-named power means for operating the elevator, said bar having a salient portion which is spaced from the ridge and is adapted to hold against said roll portions of the outsole trailing the portions of the outsole which have been moved away from the roll by the elevator thus insuring that the outsole included between the matrix bar and said elevator shall be effectively held against the action of the knife at the terminal end of the trimming cut.

9. In a machine for trimming outsoles, a carrier, a matrix bar which is journaled on said carrier for movement into different operative positions about an axis and which has an abutment ridge arranged generally parallel to said axis, a pronged supporting roll which is rotatable about an axis parallel to said axis of the matrix bar and is spaced from said ridge to form an opening adapted to receive the rear end of an outsole, a knife which is secured to the carrier and has a cutting edge arranged in said opening and which forms a gap with the ridge of the matrix bar and forms a passage with the roll, a stop, means for yieldingly moving as an entirety the supporting roll on the carrier toward the matrix bar until said movement is limited by said stop, power means for reciprocating the carrier and accordingly the matrix bar, the knife and the roll in opposite directions, means for rotating the supporting roll as the carrier moves in one direction whereby to cause the outsole conformed by the roll and the matrix bar to be held against the action of the knife to form by a splitting cut on the rear end of the outsole a heel breast covering portion which is fed through said gap and to feed a chip of surplus material split from the outsole through said passage, a yieldable presser member for forcing said chip of surplus material against the pronged roll to cause said chip by reasons of its attachment to the outsole to assist in holding the outsole against the action of the knife, an elevator adapted as the trimming cut approaches its terminal end at an inner face of the outsole to move a portion of the outsole just in advance of the cutting edge of the knife from the roll and to force it against the ridge of the matrix bar and across the locus of the cutting edge of the knife, and means operative in time relation with the movement of the carrier in said one direction for operating the elevator, said matrix bar having formed on it a salient portion which is spaced from the ridge and is adapted, when the elevator is rendered effective, to move said terminal portion of the outsole away from the roll and to cause a portion of the outsole trailing said terminal portion to be held against the pronged roll whereby to insure that the outsole is securely held against the action of the cutting edge of the knife at said terminal end of the trimming cut.

10. In a splitting machine, a carrier movable in a predetermined path, a matrix bar and a knife mounted upon the carrier for movement therewith, a roll which is mounted for movement with the carrier and which is bodily movable on the carrier toward and away from the matrix bar and is power rotated about its axis, a table which has an aperture formed in it and which is movable with the carrier and is mounted for movement with the roll toward and away from the matrix bar, a block guided for movement with the carrier and having a lost motion connection to the carrier, a gage which has a V-shaped portion adapted to be engaged by the rear end of an outsole to position the outsole on said table, a support for the gage tiltably mounted on the block, and interconnecting means between the table and the block for moving the gage between an active position above the table and an inactive position below the table upon relative movement of the table and the block in opposite directions.

11. In a trimming machine, a knife having a cutting edge, a matrix bar having a ridge positioned adjacent to and extending along the cutting edge of the knife, a roll for forcing a work piece against the ridge of said bar, means for effecting relative movement between the knife and the matrix bar on the one hand and the roll on the other hand to cause the knife progressively to trim by a splitting cut a chip of surplus material from said work piece, and a member for yieldingly forcing the chip of surplus material against said roll during the splitting cut.

12. In a trimming machine, a knife having a cutting edge, a matrix bar having a ridge positioned adjacent to and extending along the cutting edge of the knife, a pronged roll for forcing a work piece against the ridge of said bar, means for effecting relative movement between the knife and the matrix bar on the one hand and the pronged roll on the other hand to cause the knife progressively to trim by a splitting cut a chip of surplus material from said work piece, and an arcuate member for yieldingly forcing said chip of surplus material against said roll during said splitting cut to insure that the chip shall remain impaled on said roll.

13. In a trimming machine for forming a heel breast covering portion at the rear end of an outsole, a carrier, a knife which is secured to the carrier and has a straight cutting edge, a matrix bar which is mounted on the carrier and has a ridge arranged adjacent to but spaced from the edge of the knife to form a gap therewith, a rotatable roll journaled for movement as an entirety on the carrier beneath said gap and having a pronged periphery adapted to support an outsole and to force it against the ridge of the matrix bar, means for sliding the carrier in one direction from a retracted position and then in an opposite direction back to its retracted position, means for rotating the pronged roll during its movement in said one direction at a speed which causes said pronged periphery to hold the outsole substantially stationary as the roll forces the outsole against the ridge of the matrix bar whereby to cause the knife to trim a chip of surplus material from the outsole as the carrier moves in said one direction, and a member adapted yieldingly to force the chip of surplus material against the pronged roll to assist in holding the outsole against the action of the knife.

14. In a trimming machine, a frame, a rack on said frame, a carrier, a work rest formed partly on the frame and partly on the carrier, means for moving the carrier in opposite directions along the frame, a knife and an adjacent matrix bar mounted on the carrier, a toothed work supporting roll which is journaled on the carrier, means geared to the rack and adapted when the carrier moves in one of said directions positively to rotate the roll, and means for rendering said last-named means inactive when the carrier is moved in the opposite of said directions whereby to cause the roll at this time to remain stationary on the carrier.

15. In a trimming machine for forming a heel breast covering portion at the rear end of an outsole, a carrier, a knife which is secured to the carried and has a straight cutting edge, a matrix bar which is mounted on the carrier and has a ridge arranged adjacent to but spaced from the edge of the knife to form a gap therewith, a rotatable roll journaled for movement as an entirety on the carrier beneath said gap and having a pronged periphery adapted to support an outsole and to force it against the ridge of the matrix bar, means for moving the carrier in one direction from a retracted position and then in an opposite direction back to its retracted position, means for rotating the supporting roll during its movement in said one direction at a speed which causes said pronged periphery to hold the outsole substantially stationary as the roll forces the outsole against the ridge of the matrix bar whereby to cause the knife to trim material from the outsole as the carrier moves in said one direction, and means for causing the roll to cease to rotate upon the carrier during its movement in said opposite direction with the carrier.

16. In a trimming machine, a knife having a cutting edge, a matrix positioned adjacent to and extending along the cutting edge of the knife, means for gripping a work piece and forcing it against the matrix, mechanism for effecting relative movement between the knife and the matrix on the one hand and said means on the other hand for progressively trimming by a splitting cut a chip of surplus material from the work piece, and a presser member for yieldingly forcing the chip of surplus material against said means during the splitting cut.

References Cited in the file of this patent
UNITED STATES PATENTS
2,677,140     Lane _____ May 4, 1954